US009189824B2

(12) United States Patent
Nixon

(10) Patent No.: US 9,189,824 B2
(45) Date of Patent: Nov. 17, 2015

(54) DYNAMIC AVIATION PLANNING TOOL

(71) Applicant: McFarland-Johnson, Inc., Binghamton, NY (US)

(72) Inventor: Chad Glenn Nixon, Endicott, NY (US)

(73) Assignee: McFarland-Johnson, Inc., Binghamton, NY (US)

( * ) Notice: Subject to any disclaimer, the term of this patent is extended or adjusted under 35 U.S.C. 154(b) by 378 days.

(21) Appl. No.: 13/794,083

(22) Filed: Mar. 11, 2013

(65) Prior Publication Data

US 2014/0257760 A1    Sep. 11, 2014

(51) Int. Cl.
*G06G 7/48* (2006.01)
*G06Q 50/30* (2012.01)
*G06Q 10/06* (2012.01)

(52) U.S. Cl.
CPC .............. *G06Q 50/30* (2013.01); *G06Q 10/06* (2013.01)

(58) Field of Classification Search
CPC ....... G06F 163/00; G06F 19/00; G06F 21/24; G06G 7/76; G08G 5/00; G08G 5/06; G01C 21/00; H04L 9/08
See application file for complete search history.

(56) References Cited

U.S. PATENT DOCUMENTS

| | | | | |
|---|---|---|---|---|
| 3,729,153 | A * | 4/1973 | Wilde | 244/114 R |
| 5,948,040 | A * | 9/1999 | DeLorme et al. | 701/426 |
| 6,195,609 | B1 * | 2/2001 | Pilley et al. | 701/120 |
| 2004/0059497 | A1 * | 3/2004 | Sankrithi | 701/120 |
| 2010/0063716 | A1 * | 3/2010 | Brozat | 701/120 |
| 2012/0245836 | A1 * | 9/2012 | White et al. | 701/120 |
| 2013/0262866 | A1 * | 10/2013 | Gu | 713/167 |

OTHER PUBLICATIONS

P & D Aviation et al., "Portland International Airport Master Plan, Summary Report", Sep. 2000.*
de Neufville, R., "Building Airport Systems for the Next Generation", Journal of National Academy of Engineering, 2008.*
Szyliowicz et al., "Getting realistic about megaproject planning: The case of the new Denver International Airport", Policy Sciences 28, 1995.*
Smith, M. A., "The evaluation of alternative airport plans", University of British Columbia, Sep. 1968.*
Dross et al., "Reflections on relational planning: Case studies in the Airport Regions of Amsterdam, Barcelona and Munich", 48th Congress of the European Regional Science Association, Aug. 27-31, 2008.*

(Continued)

*Primary Examiner* — Kandasamy Thangavelu
(74) *Attorney, Agent, or Firm* — Harris Beach PLLC

(57) ABSTRACT

A method for airport dynamic aviation planning is disclosed. The method includes the steps of populating an existing conditions database comprising an inventory of existing conditions data at the airport, defining an aviation planning scenario with a graphical user interface by selecting input parameters, developing, by a processor, a future growth forecast comprising future levels of aviation activity at the airport in response to the selected input parameter, generating, by a processor, a facility requirements summary needed to satisfy the selected input parameter by comparing the difference between the future growth forecast and the existing conditions data, and generating, by a processor, a dynamic airport layout plan graphically representing the facility requirements.

20 Claims, 11 Drawing Sheets

(56) References Cited

OTHER PUBLICATIONS

Ensor, J.D., "Innovative Finance in the UAL-DIA Agreement", 1.231 Airport Planning and Design, Dec. 9, 2004.*

Johansson, O., "Inter-urban competition and air transport in the deregulated era: The Nashville case", Journal of Transport Geography, 2007.*

* cited by examiner

| | EXISTING FACILITY OR CAPACITY | ULTIMATE REQUIREMENT | DEFICIT | | 2040 | EXISTING FACILITY OR CAPACITY | ULTIMATE REQUIREMENT | DEFICIT |
|---|---|---|---|---|---|---|---|---|
| RUNWAYS | | | | | APPROACH PROCEDURES | | | |
| RUNWAY 10L/28R LENGTH | 9,829 | 9,829 | NONE | | RUNWAY 10L APPROACHES | NONE | ILS | ILS |
| RUNWAY 10L/28R WIDTH | 150 | 200 | 50 | | | | | |
| RUNWAY 10L/28R RSA LENGTH | 1,000 | 1,000 | NONE | | RUNWAY 28R APPROACHES | ILS, LOC, TACAN, NDB | ILS | NONE |
| RUNWAY 10L/28R RSA WIDTH | 500 | 500 | NONE | | RUNWAY 6 APPROACHES | NONE | NONE | NONE |
| RUNWAY 10L/28R OFA LENGTH | 1,000 | 1,000 | NONE | | RUNWAY 24 APPROACHES | NONE | NONE | NONE |
| RUNWAY 10L/28R OFA WIDTH | 800 | 800 | NONE | | RUNWAY 10R APPROACHES | NONE | NONE | NONE |
| RUNWAY 10R/28L LENGTH | 3,973 | 3,973 | NONE | | RUNWAY 28L APPROACHES | NONE | NONE | NONE |
| RUNWAY 10R/28L WIDTH | 75 | 75 | NONE | | TAXIWAYS | | | |
| RUNWAY 10R/28L RSA LENGTH | 240 | 240 | NONE | | TAXIWAY "A" WIDTH | 75 | 100 | 25 |
| RUNWAY 10R/28L RSA WIDTH | 120 | 120 | NONE | | TAXIWAY "A" OFFSET | 500 | 500 | NONE |
| RUNWAY 10R/28L OFA LENGTH | 240 | 240 | NONE | | TAXIWAY "D" WIDTH | 75 | 75 | NONE |
| RUNWAY 10R/28L OFA WIDTH | 250 | 250 | NONE | | TAXIWAY "D" OFFSET | 400 | 400 | NONE |
| RUNWAY 6/24 LENGTH | 5,188 | 5,188 | NONE | | LIGHTING AND NAVAIDS | | | |
| RUNWAY 6/24 WIDTH | 150 | 150 | NONE | | RUNWAY 10L/28R | HIRL, RVR(28R), MALSR (28R), VASI (10L), BEACON | HIRL, RVR(28R), MALSR, PAPI, CENTERLINE LIGHTS | PAPI, CENTERLINE LIGHTS, MALSR (10L) |
| RUNWAY 6/24 RSA LENGTH | 1,000 | 1,000 | NONE | | | | | |
| RUNWAY 6/24 RSA WIDTH | 500 | 500 | NONE | | RUNWAY 10R/28L | MIRL, PAPI, REIL, BEACON | MIRL, PAPI, REIL, BEACON | NONE |
| RUNWAY 6/24 OFA LENGTH | 1,000 | 1,000 | NONE | | | | | |
| RUNWAY 6/24 OFA WIDTH | 800 | 800 | NONE | | RUNWAY 6/24 | MIRL, PAPI, REIL, BEACON | MIRL, PAPI, REIL, BEACON | NONE |
| RUNWAY PROTECTION ZONES | | | | | LANDSIDE | | | |
| RUNWAY 10L RPZ INNER WIDTH | 500 | 1,000 | 500 | | CONVENTIONAL HANGARS | 62,500 SQ. FT. | 80,000 SQ. FT. | NONE |
| RUNWAY 10L RPZ OUTER WIDTH | 1,010 | 1,510 | 500 | | T-HANGERS | 36 UNITS | 36 UNITS | NONE |
| RUNWAY 10L RPZ LENGTH | 1,700 | 1,700 | NONE | | CONSOLIDATED GA APRON DEMAND | 62,500 SQ. YD. | 42,500 SQ. YD. | NONE |
| RUNWAY 28R RPZ INNER WIDTH | 1,000 | 1,000 | NONE | | DEICING APRON | 10,000 SQ. YD. | 20,000 SQ. YD. | 10,000 SQ. YD. |
| RUNWAY 28R RPZ OUTER WIDTH | 1,750 | 1,750 | NONE | | AIRCRAFT MAINTENANCE AREA | 8,000 SQ. FT. | 8,000 SQ. FT. | NONE |
| RUNWAY 28R RPZ LENGTH | 2,500 | 2,500 | NONE | | AIRTIME TERMINAL | 62,500 SQ. FT. | 62,500 SQ. FT. | NONE |
| RUNWAY 10R RPZ INNER WIDTH | 250 | 250 | NONE | | CARGO FACILITY | 100,000 SQ. FT. | 250,000 SQ. FT. | 150,000 SQ. FT. |
| RUNWAY 10R RPZ OUTER WIDTH | 450 | 450 | NONE | | AIRLINE TERMINAL PARKING | 1,200 SPACES | 1,200 SPACES | NONE |
| RUNWAY 28L RPZ INNER WIDTH | 1,000 | 1,000 | NONE | | CARGO FACILITY PARKING | 20 SPACES | 200 SPACES | 180 SPACES |
| RUNWAY 28L RPZ OUTER WIDTH | 250 | 250 | NONE | | GA AREA AUTO PARKING | 20 SPACES | 20 SPACES | NONE |
| RUNWAY 28L RPZ LENGTH | 240 | 240 | NONE | | ARFF FACILITY | 3,000 SQ. FT. | 3,000 SQ. FT. | NONE |
| RUNWAY 6 RPZ INNER WIDTH | 1,000 | 1,000 | NONE | | AVGAS STORAGE | 17,500 GAL. | 15,000 GAL. | NONE |
| RUNWAY 6 RPZ OUTER WIDTH | 500 | 500 | NONE | | JET-A STORAGE | 35,000 GAL. | 80,000 GAL. | 45,000 GAL. |
| RUNWAY 6 RPZ LENGTH | 700 | 700 | NONE | | | | | |
| RUNWAY 24 RPZ INNER WIDTH | 1,000 | 1,000 | NONE | | | | | |
| RUNWAY 24 RPZ OUTER WIDTH | 500 | 500 | NONE | | | | | |
| RUNWAY 24 RPZ LENGTH | 700 | 700 | NONE | | | | | |
| | 1,000 | 1,000 | NONE | | | | | |

DYNAMIC AVIATION PLANNING TOOL

FIELD OF THE INVENTION

This disclosure relates generally to aviation planning and, more specifically, to a computer-implemented data analysis tool for scenario-based aviation planning.

BACKGROUND OF THE INVENTION

Airport master planning is a critical tool in determining needs and development at individual airports. An airport Master Plan is a comprehensive study of an airport and usually describes the short-, medium-, and long-term development plans to meet future aviation demand. Elements of an airport Master Plan typically include an Existing Conditions portion that provides an inventory of pertinent data for use in subsequent Plan elements; an Aviation Forecast portion that estimates aeronautical demand for short-, medium-, and long-term time frames; a Facility Requirements portion that assesses the ability of the existing airport, both airside and landside, to support the forecast demand. Additionally, the Master Plan may also include an Environmental Considerations portion to provide a clear understanding of the environmental requirements needed to move forward with each project in the recommended development program. Based upon the facility requirements and considering the environmental considerations, a set of development alternatives are considered before settling on a single alternative that is recommended.

The Master Plan also includes an Airport Layout Plan (ALP), which can include a narrative portion accompanying a set of drawings, which are generally based upon the recommended alternative. The narrative portion of the ALP will typically describe ALP development criteria and the rationale for the development shown on the ALP. The drawing portion provides a graphic depiction of the long-term development plan for the airport, and includes current and future airport facilities. The drawings include required airport feature classifications, description labels, imaginary surfaces, Runway Protection Zones, Runway Safety Areas and basic airport and runway data tables.

Current methods of preparing the Master Plan and ALP typically consume hundreds and sometimes thousands of man-hours. The current method is also static and not easily changed. If a change to the airport, the industry or a new opportunity that isn't included in the Master Plan and ALP presents itself, another lengthy planning process is required to analyze the potential for accommodating the new change or opportunity.

SUMMARY OF THE INVENTION

In accordance with one aspect of the disclosure, a computer-implemented dynamic analysis tool for aviation planning is provided. The dynamic analysis tool includes a computer processor, a computer readable storage medium coupled to the computer processor, memory coupled to the computer processor, and an existing conditions database coupled to the computer processor. The existing conditions database includes existing conditions data selected from the group consisting of the physical facilities on the airport, the regional setting of the airport and surrounding land uses, the environmental setting of the airport, aviation forecasting baseline data, and airport business affairs. The dynamic analysis tool further includes program instructions to create an aviation planning scenario by accepting a user-selectable parameter associated with the existing conditions data, program instructions to compute future growth forecast data of future levels of aviation activity in response to the user-selectable parameter, program instructions to compute airport facility requirements needed to satisfy the user-selectable parameter by comparing the difference between the future growth forecast data and the existing conditions data, and program instructions to create a dynamic airport layout plan graphically representing the facility requirements. The program instructions are stored on the computer readable storage medium for execution by the computer processor.

In accordance with another aspect of the disclosure, a computer program product for dynamic analysis of aviation planning functions is provided. The computer program product includes a computer readable storage medium having computer readable program code embodied therewith. The computer readable program code includes: computer readable program code configured to create an aviation planning scenario by accepting a user-selectable parameter associated with existing conditions data, compute future growth forecast data of future levels of aviation activity in response to the user-selectable parameter, compute airport facility requirements needed to satisfy the user-selectable parameter by comparing the difference between the future growth forecast data and the existing conditions data, and create a dynamic airport layout plan graphically representing the facility requirements.

In another aspect of the invention, a method for airport dynamic aviation planning is disclosed. The method includes the steps of populating an existing conditions database comprising an inventory of existing conditions data at the airport, defining an aviation planning scenario with a graphical user interface by selecting input parameters, developing, by a processor, a future growth forecast comprising future levels of aviation activity at the airport in response to the selected input parameter, generating, by a processor, a facility requirements summary needed to satisfy the selected input parameter by comparing the difference between the future growth forecast and the existing conditions data, and generating, by a processor, a dynamic airport layout plan graphically representing the facility requirements.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

FIG. 4 depicts an exemplary screen shot of a dynamic aviation growth forecast including passenger enplanements, operations, and projected based aircraft by type, along with other key data according to another embodiment of the invention;

FIG. 5 depicts an exemplary screen shot of a Facility Requirements table according to one embodiment of the invention;

DETAILED DESCRIPTION OF THE INVENTION

Figure 1:
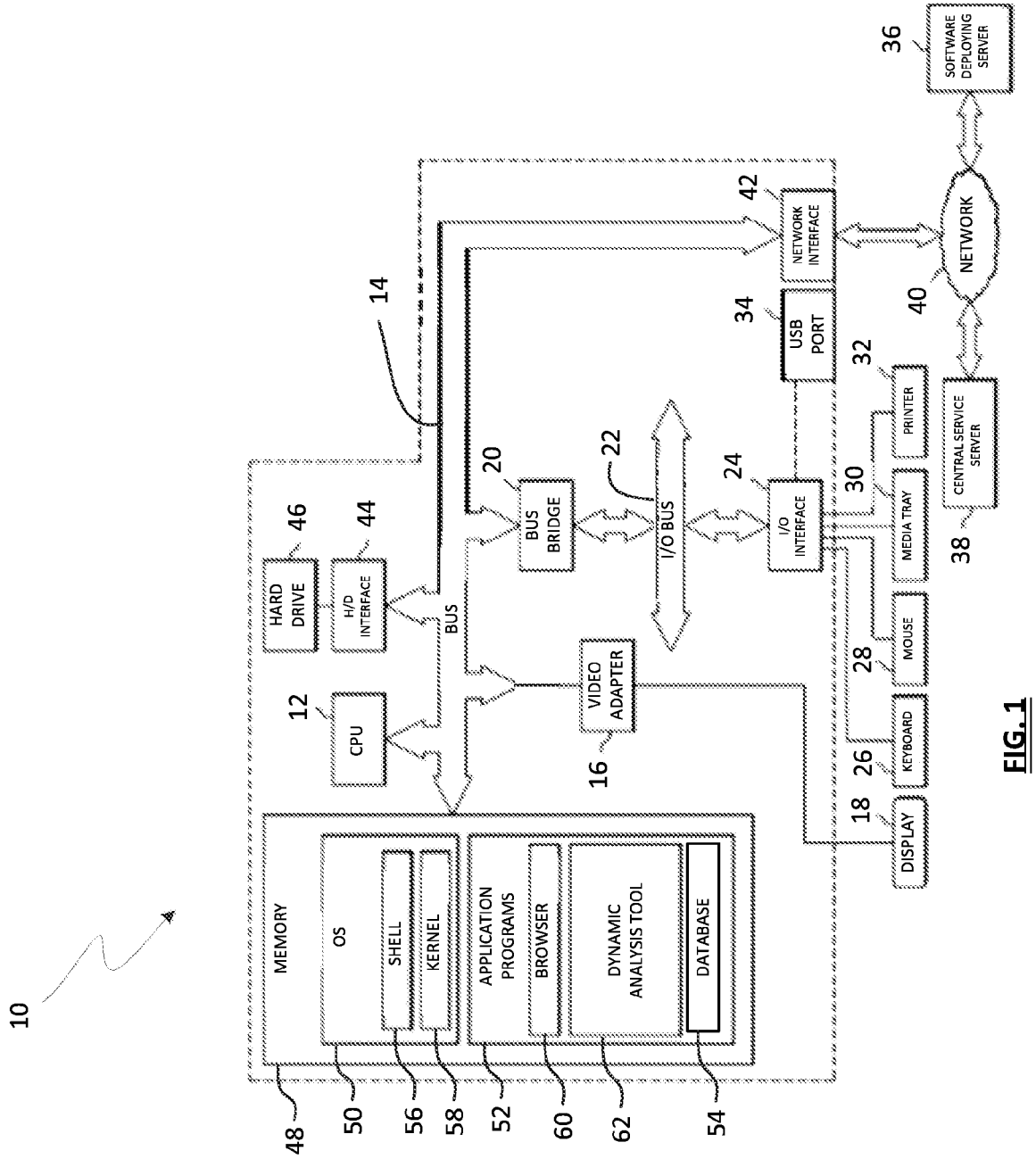
FIG. 1 depicts a block diagram of a computer system having a computer readable storage medium, the computer system suitable for storing and/or executing computer code that implements various aspects of the present invention as described in greater detail herein.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Program code embodied on a computer-readable medium may be transmitted using any appropriate medium, including but not limited to wireless, wireline, optical fiber cable, RF, etc., or any suitable combination of the foregoing.

Computer program code for carrying out operations of the present invention may be written in any combination of one or more programming languages, including an object oriented programming language such as Visual Basic, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures, and in particular, with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a block diagram of a dynamic analysis tool (DAT), realized as a computer 10 having a computer readable storage medium which may be utilized by the present disclosure. The computer system is suitable for storing and/or executing computer code that implements various aspects of the present invention. Note that some or all of the exemplary architecture, including both depicted hardware and software, shown for and within computer 10 may be utilized by a software deploying server and/or a central service server.

The computer 10 includes a processor (or CPU) 12 that is coupled to a system bus 14. Processor 12 may utilize one or more processors, each of which has one or more processor cores. A video adapter 16, which drives/supports a display 18, is also coupled to system bus 14. System bus 14 is coupled via a bus bridge 20 to an input/output (I/O) bus 22. An I/O interface 24 is coupled to (I/O) I/O bus 22. I/O interface 24 affords communication with various I/O devices, including a keyboard 26, a mouse 28, a media tray 30 (which may include storage devices such as CD-ROM drives, multi-media interfaces, etc.), a printer 32, and external USB port(s) 34. While the format of the ports connected to I/O interface 24 may be any known to those skilled in the art of computer architecture, in a preferred embodiment some or all of these ports are universal serial bus (USB) ports.

As depicted, computer 10 is able to communicate with a software deploying server 36 and central service server 38 via network 40 using a network interface 42. Network 40 may be an external network such as the Internet, or an internal network such as an Ethernet or a virtual private network (VPN).

A storage media interface 44 is also coupled to system bus 22. The storage media interface 44 interfaces with a computer readable storage medium 46, such as a hard drive. In a preferred embodiment, storage medium 46 populates a computer readable memory 48, which is also coupled to system bus 22. Memory 48 is defined as a lowest level of volatile memory in the computer 10. This volatile memory includes additional higher levels of volatile memory (not shown), including, but not limited to, cache memory, registers and buffers. Data that populates memory 48 includes the computer 10's operating system (OS) 50 and application programs 52. Memory 48 may further include an existing conditions and aviation forecasting baseline database 54 for storing application-specific data. In other embodiments (not shown), existing conditions database 16 may be accessed via network 40 and the central service server 38, for example.

Operating system operating system 50 includes a shell 56, for providing transparent user access to resources such as application programs 52. Generally, shell 56 is a program that provides an interpreter and an interface between the user and the operating system. More specifically, shell 56 executes commands that are entered into a command line user interface or from a file. Thus, shell 56, also called a command processor, is generally the highest level of the operating system software hierarchy and serves as a command interpreter. The shell 56 provides a system prompt, interprets commands entered by keyboard, mouse, or other user input media, and sends the interpreted command(s) to the appropriate lower levels of the operating system (e.g., a kernel 58) for processing. Note that while shell 56 is a text-based, line-oriented user interface, the present disclosure will equally well support other user interface modes, such as graphical, voice, gestural, etc.

As depicted, operating system (OS) 50 also includes kernel 58, which includes lower levels of functionality for OS 50, including providing essential services required by other parts of OS 50 and application programs 52, including memory management, process and task management, disk management, and mouse and keyboard management.

Application programs 52 include a renderer, shown in exemplary manner as a browser 60. Browser 60 includes program modules and instructions enabling a world wide web (WWW) client (i.e., computer 10) to send and receive network messages to the Internet using hypertext transfer protocol (HTTP) messaging, thus enabling communication with software deploying server 36 and other described computer systems.

The hardware elements depicted in computer 10 are not intended to be exhaustive, but rather are representative to highlight components useful by the present disclosure. For instance, computer 10 may include alternate memory storage devices such as magnetic cassettes (tape), magnetic disks (floppies), optical disks (CD-ROM and DVD-ROM), and the like. These and other variations are intended to be within the spirit and scope of the present disclosure.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Application programs 52 in computer 10's memory (as well as software deploying server 36's system memory) also include a dynamic analysis program 62 to dynamically develop scenario-based aviation growth forecasting methodologies. Airport growth forecasts estimate future levels of aviation activity and can be used to determine the need for new or expanded facilities. The specific activity elements to be forecast will vary depending on the size and category of an airport and the objectives of the Master Plan, but usually include at least aircraft operations, critical aircraft, and passenger enplanements.

Figure 2:
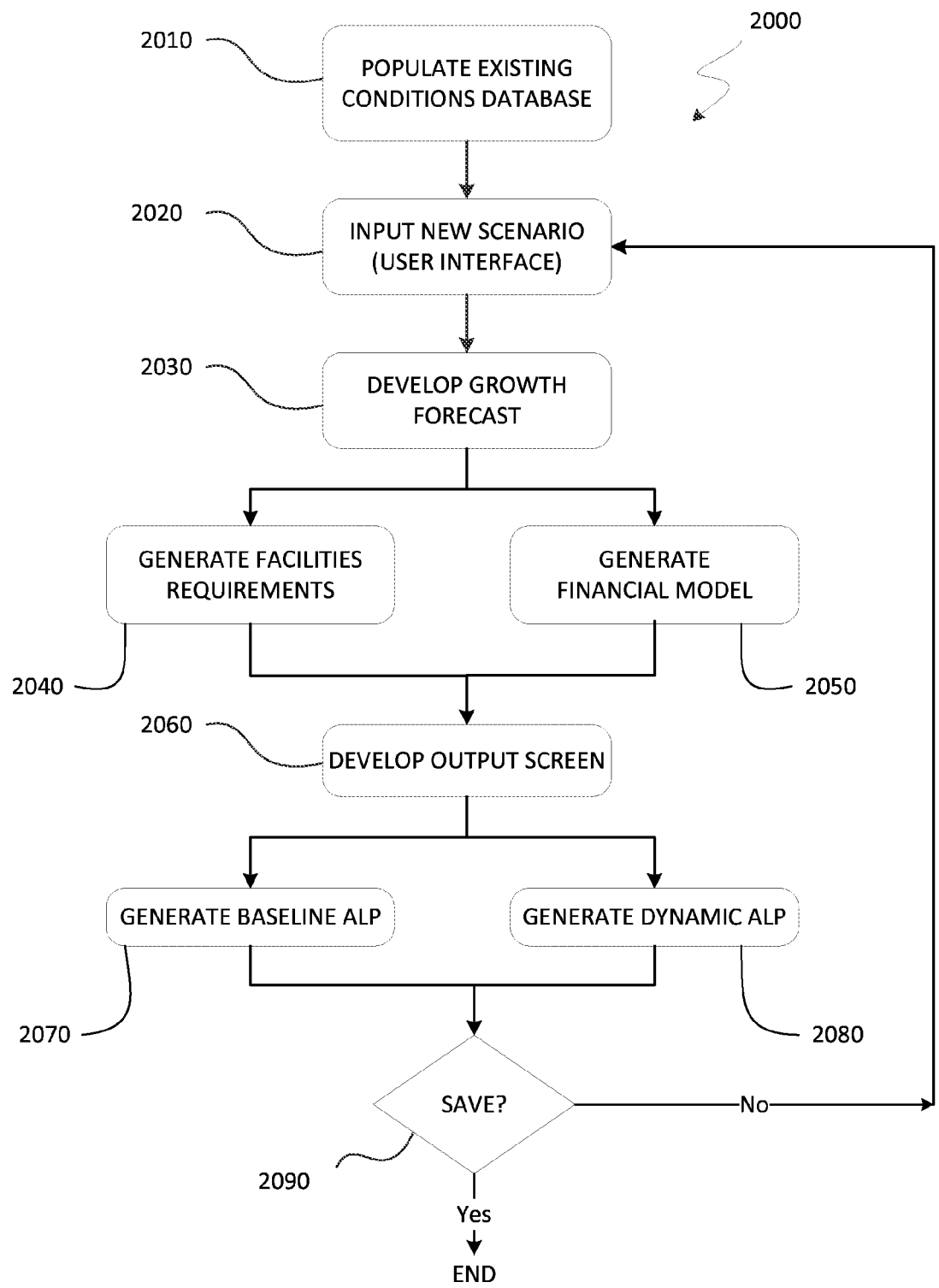
FIG. 2 depicts a flow chart illustrating an exemplary method for a dynamic analysis tool in accordance with one embodiment of the present invention.

FIG. 2 depicts a flow chart illustrating an exemplary method 2000 for the dynamic analysis tool, in accordance with one embodiment of the present invention. At a step 2010, the existing conditions database 54 is populated, which is an inventory of existing conditions data for use in the program 62. The existing conditions data may broadly include the physical facilities on the airport, the regional setting of the airport and surrounding land uses, the environmental setting of the airport, historical aviation activity, aviation forecasting baseline data, and airport business affairs.

The inventory and description of the physical facilities data can include drawings and other documents, field observations, and surveys, for example. The physical facilities data may be categorized. One exemplary category is an Airfield/Airspace category, which includes data pertaining to functional use and geometry of runways, taxiways, and holding aprons; lighting, marking, and signing of runways and taxiways; navigational aids; visual approach aids, and instrument approach procedures. The Airfield/Airspace category may further include data on the use of the airspace and how air traffic is managed, including operational limitations resulting from traffic interaction with other airports or reserved airspace, obstructions to air navigation, noise abatement procedures, and airfield or navigational aid shortcomings. The Airfield/Airspace category may further include historical data on weather conditions, such as prevailing wind direction and speed, as well as the occurrence of critical combinations of ceiling and visibility. If applicable, the existence of, or the need for, Remain-Overnight-Parking (RON) could be included in the airfield/airspace category.

The physical facilities data may be categorized by facility type. A Commercial Passenger Terminal Facilities category could include inventory of terminal building space by functional use and size. Example data in this category can include ticket counters, number of gates, linear feet of gate frontage, aircraft parking apron area, restaurants and other concession space, and passenger security screening procedures. A General Aviation Facilities category could include the quantity and type of hangars; transient aircraft parking apron areas, tie-down positions; general aviation terminal facilities; aircraft parking aprons; fixed base operators; flight schools; pilot shops; and the number and mix of based aircraft. A Cargo Facilities category could include the quantity and area of air cargo buildings and aircraft parking aprons. At airports with significant air cargo activity, freight forwarders and other support functions are often located in areas adjacent to the airport and may be included in the physical facilities data. A Support Facilities category may include the quantity and type of support facilities at an airport that encompass a broad set of functions that ensure smooth and efficient airport operation, including Aircraft Rescue and Fire Fighting stations, airport administrative areas, airport maintenance facilities, airline maintenance hangars, flight kitchens, aircraft fuel storage, heating and cooling systems, and FAA facilities, for example.

The physical facilities data may further include a category for Access, Circulation and Parking. This category could include data pertaining to the quantity and type of ground access systems and commercial areas that serve the airport, or are served by it, such as on-airport access roads, circulation and service roads, parking and curb space, including information on their alignment, condition and capacity. Also included could be data on public transportation services, such as bus, rail, taxi and limousine, and the split between personal and public transportation. The Access, Circulation and Parking Consultation category could also include data on proposed highway and transit plans, if available, as well as traffic density statistics relative to surface systems leading to and from the airport. Data on rental car facilities and activity may be included in this category, if available.

A Utilities category could include a description of and data pertaining to major elements of the infrastructure that service the airport's utility demands for water, sanitary sewer, communications, heating and cooling, and power. Historical consumption data may be included as necessary to quantify future utility loads. Storm-water drainage, deicing and industrial waste disposal systems may also be included.

Finally, the physical facilities data may include a Miscellaneous category, which could include non-aeronautical uses such as recreational facilities and parks, industrial parks, agricultural or grazing leases, and retail businesses, for example.

The existing conditions database 54 may also include data pertaining to the regional setting of the airport and surrounding land uses, including the land uses in areas that will be exposed to airport operations. The data may include the political boundaries of the airport and the political entities with jurisdiction over the operation of the airport and adjacent land uses. The data may also include the airport service area and the presence and role of airports that might compete with the study airport. The surrounding land use data may preferably include information on planned and proposed land uses, as well as on existing uses. The data may further include land uses that may affect the safe operation of the airport or influence its expansion. Structures that could obstruct air navigation, or the presence of other airports that may interfere with the study airport, are the principal safety concern. The data may also identify areas located near the airport that may represent a potential hazard to aircraft, such as flood control areas, stockyards, and sanitary landfills.

The regional setting data may comprise official maps, the latest area-wide comprehensive land use and transportation plan, applicable municipal zoning ordinances and other land use controls and unusual building code provisions, including height zoning ordinances, noise overlay zones, and airport overlay districts. The data may further comprise geographic information systems (GIS), aerial photographs, topographical maps, obstruction charts, aeronautical charts, approach plates and other mapping tools to examine and display land use details.

The existing conditions database 54 may also include data pertaining to the environmental setting of the airport. The environmental setting data can document environmental conditions that should be considered in the identification and analysis of airport development alternatives, discussed below. Other environmental setting data may include noise levels, air and water quality, solid waste generation and disposal, toxic material disposal, floodplains and wetlands, endangered and threatened species of flora and fauna, biotic communities, parklands and recreational areas, historic, architectural, archaeological and cultural resources, and prime and unique farmland. In one example, the environmental setting data can be placed in a GIS database for better data visualization, communication, and analysis.

The existing conditions database 54 may also include data pertaining to the historical and current aviation activity of the airport. This information is referred to as the aviation forecasting baseline database. The aviation forecasting baseline database may include identification of the air carriers, the proportion of operations and enplanements by each of the air carriers, the markets served, the number of originating, terminating, and connecting passengers, the proportions of domestic and international passengers, and air cargo activity, for example. The aviation forecasting baseline data may further include a breakdown of the fleet mix of aircraft using the airport. For general aviation activity, the data may identify the category and class of aircraft, types of fuels those aircraft use, the type of airport services used, and the availability of hangars for tenant and transient aircraft.

The existing conditions database 54 may also include historical and current financial data for the airport to be used in forecasting future revenue streams. In one example, the financial data includes the last three years of operating revenues and expenses. Operating revenues can be divided into airline revenues and non-airline revenues, for example. Non-airline revenues can be subdivided into categories such as terminal concessions, rental car, parking, hangar, land, and other rentals, and tax revenues. Operating expenses can be divided into broad categories such as personnel, maintenance, utilities and supplies, other, and debt service, for example.

One noted problem with the current process of developing growth forecasts is that they produce a fixed result. That is, all the input variables and assumptions are fixed to provide single output—the Master Plan or Airport Layout Plan. The plans are submitted to local or federal governments for approval and, once approved, may not be changed without significant expenditures of time and money. Although the fixed result model can be useful and may be advantageous for certain applications, it suffers from drawbacks. One drawback is that a fixed result is problematic when airport planners wish to explore possible alternative scenarios over and above the "normal" projected growth. For instance, in an effort to increase revenues, an airport planner may wish to explore the possibility of adding a new low-fare carrier to the airport, add an international cargo carrier, or both. Using current methods of preparing a Master Plan or Airport Layout Plan, evaluating the scenarios would consume hundreds of man-hours.

Figure 3:
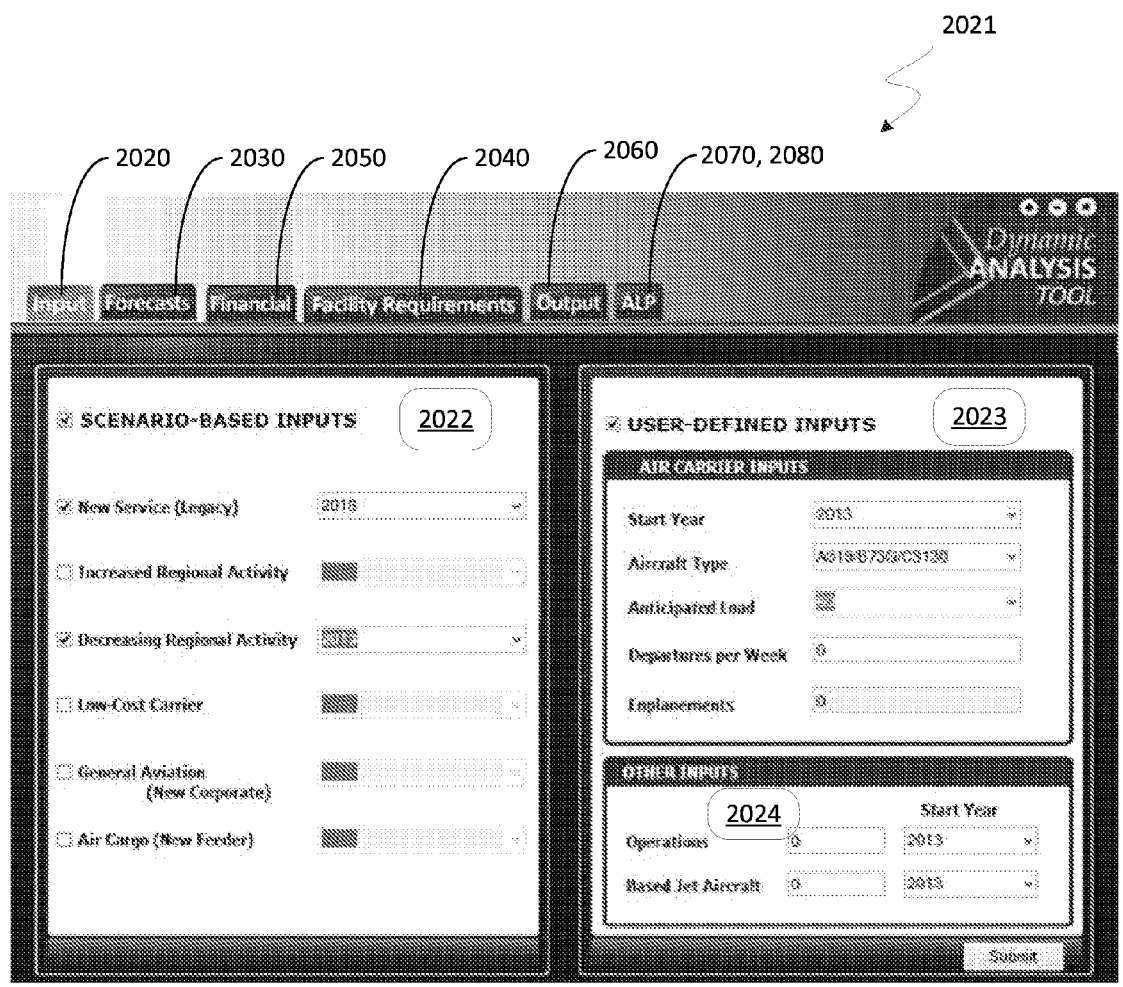
FIG. 3 depicts an exemplary graphic user interface of the dynamic analysis tool according to one embodiment of the invention.

The inventor of the present invention has recognized this deficiency and devised a computer-implemented dynamic analysis tool for aviation planning that allows users to configure the input data and receive immediate output in the form of a dynamic growth forecast. Referring to FIG. 2, the method 2000 includes a step 2020 of defining an aviation planning scenario by selecting input parameters. FIG. 3 depicts an exemplary graphical user interface (GUI) 2021 that implements step 2020. In one embodiment of the current invention, the dynamic analysis program 62 permits users to create a custom forecast based upon pre-loaded scenario-based inputs 2022, user-defined inputs 2023, other inputs 2024, or any combination thereof. Examples of user-selectable scenario-based inputs 2022 include New Service, Increased or Decreased Regional Activity, addition of a Low-Cost Carrier, adding a new General Aviation tenant, or adding a new Air Cargo Feeder. In one example, a user scenario may be pre-loaded into the program 62 after consultation with airport operators. In this manner, the scenarios can be customized to a specific airport. For example, a large airport may request a pre-loaded scenario for adding or expanding international air cargo facilities. In contrast, a small regional airport would have no use for the air cargo scenario, and instead may request a pre-loaded scenario comprising corporate hangers. Because they are pre-loaded, the scenario-based inputs 2022 simplify the amount of data the user must input. In the illustrated example, the user need only indicate from the drop-down box the year in which the scenario 2022 is to commence.

The GUI 2021 may further include user-defined inputs 2023 for additional customization and, in some cases, a higher degree of granularity to the scenarios. In one embodiment, the user-defined inputs 2023 may include adding a low-cost Air Carrier. The user-defined inputs 2023 could allow selection among several choices, such as Southwest or JetBlue Airlines. The user could then select the commencement of the scenario (e.g., the Start Year). The Aircraft Type could be automatically configured in response to the selected air carrier, or may be selected form a drop-down list. For example, some low-cost airlines only operate a single type of jet aircraft. The user could select the anticipated Load Factor, the Departures per Week, and Enplanements.

The GUI 2021 may further include other inputs 2024, such as changing the number of operations in a certain year, or the number of based jet aircraft at locations for the airport.

Once the user defines the input scenario, the method 2000 for the DAT may include a step 2030 to develop a future growth forecast for the airport. The future growth forecast estimates future levels of aviation activity and can be used to determine the need for new or expanded facilities. The specific activity elements to be forecast will vary depending on the size and category of an airport and the objectives of the Master Plan, but usually include at least aircraft operations, critical aircraft, and passenger enplanements. The growth forecast typically includes demand elements such as annual operations data from itinerant air carriers and local general aviation, passenger enplanements, cargo data, and aircraft mix. The future growth forecast can be prepared using a variety of known techniques, including regression analysis, trend analysis and extrapolation, market share analysis, and smoothing, for example. In another example, the future growth forecast may comprise an existing forecast, such as a Terminal Area Forecast (TAF) or state aviation system plans.

Figure 4:
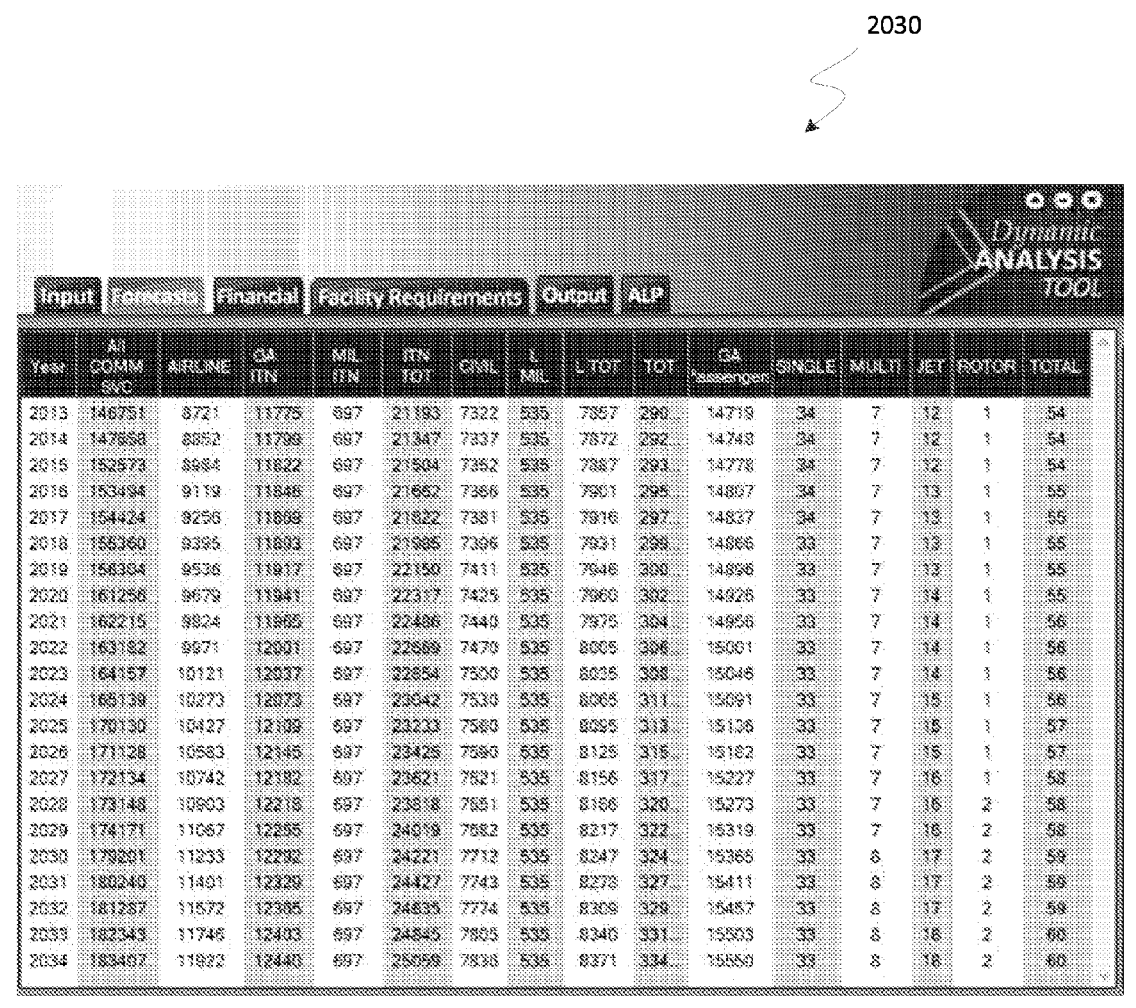

FIG. 4 illustrates an exemplary screen shot of a dynamic future growth forecast 2030 according to one embodiment of the invention. In one example, this screen can be accessed by clicking on the "Forecasts" tab of the GUI 2021. The columns in the illustrated embodiment show, for each year, forecast parameters such as All Commercial Service passenger enplanements, Airline-specific passenger enplanements, the General Aviation Itinerant aircraft operations, the Military Itinerant aircraft operations, etc. These forecast numbers are unique to each user-generated scenario, and are used as input to develop concomitant facilities requirements and financial data.

The dynamic analysis program 62 may generate one or more useful outputs in response to the user-input scenario, reflecting possible outcomes in support of the input. In one embodiment of the invention, at a step 2040 the program 62 generates a Facility Requirements summary. FIG. 5 illustrates an exemplary screen shot of a Facility Requirements table 2040 according to one embodiment of the invention. The table can be accessed by clicking on the "Facility Requirements" tab of the GUI 2021. In the illustrated embodiment, the Facility Requirements table 2040 includes three columns: existing capacity, ultimate or final requirement based upon the user-created scenario, and deficit.

The existing facility or capacity data is called from the existing conditions database 54 (FIG. 1), and may include parameters for major features such as runways, taxiways, buildings, aircraft rescue and firefighting (ARFF) facilities, operations facilities, and hangers, for example. Specific runway parameters may include the Runway Safety Area (RSA), the Runway and Taxiway Object Free Areas (ROFA and TOFA), the Runway Protection Zone (RPZ), the width and length of each runway, and instrument designation such as visual approach, non-precision instrument approach, or precision instrument approach, along with the required lighting and navigational aids.

The ultimate requirement column displays the updated or new facility/capacity requirements in response to the user-selected scenario. Each scenario has a set of requirements associated with it, and these requirements are supplanted over the existing conditions. For example, the scenario illustrated in FIG. 3 includes new service and the addition of several types of aircraft, namely the Airbus A319, the Boeing 737-700, and the Bombardier CS130. Facility requirements associated with each aircraft type, such as runway data, may be obtained from a lookup table, for example, and compared with the existing data. The maximum parameter (or minimum, if appropriate) for the group is then output in the ultimate requirement field. In many cases, the scenario presents no requirements over and above the existing conditions, and the ultimate requirement value remains the same as the existing value.

In some cases, the comparison identifies requirements greater than, or exceeding the limits of, the existing conditions. The dynamic analysis program 62 may then output in the deficit column the amount or value by which the existing parameter is exceeded. This value then becomes input for required changes to the dynamic airport layout plan, discussed below. For example, referring to FIG. 5, the requested scenario indicates existing Runway 10L/28R is 50 feet too narrow; existing Runway 10L RPZ Inner and Outer Widths are 500 too narrow, Runway 10L Approach needs Instrument Landing System (ILS), etc. Note that the Deficit column could alternatively display the comparison results in a slightly different manner, such as by displaying a "surplus" when there is more than the required capacity.

As noted, the dynamic analysis program 62 may generate one or more useful outputs in response to the user-input scenario. In one embodiment of the invention, at a step 2050 the program 62 generates detailed financial data which may be accessed by clicking on the "Financial" tab of the GUI 2021. The financial data is directly linked to the user-created scenario and includes projected future revenues and expenses to reveal the fiscal impact of the scenario. In one embodiment, baseline financial information can be loaded into the existing conditions database 54, and may include the last three years of revenues, costs, etc. associated with the airport. The projected future expenses may be extrapolated into the future based on certain assumptions such as consumer price index, timing for renewal of leases, capital costs for terminal expansion (e.g., $300/sq. ft.), etc. The projected future revenues may be extrapolated into the future based on expected growth in enplanements, revenue streams from new air cargo operations, etc.

In one example, a scenario 2020 adding a low cost carrier to an airport resulted in a dynamic future growth forecast 2030 of an additional 10,000 enplanements per year. As a result, the financial model 2050 projected $120,000 in new annual revenue, $85,000 in annual fixed costs, and $25,000 annually in new capital costs.

In another example, addition of a new airline service resulted in a dynamic future growth forecast 2030 of an additional 5,000 enplanements per year. As a result, the financial model 2050 projected $70,000 in new annual revenue, $60,000 in annual fixed costs, and $10,000 annually in new capital costs.

It can be appreciated from the above examples that one advantage of the disclosed dynamic analysis tool over traditional methods is that a user may receive virtually instantaneous facility requirements and crucial financial projections for a given scenario. If the resulting financial projections do not appear favorable, the user can propose other scenarios in real-time and assess their impact.

Figure 6:
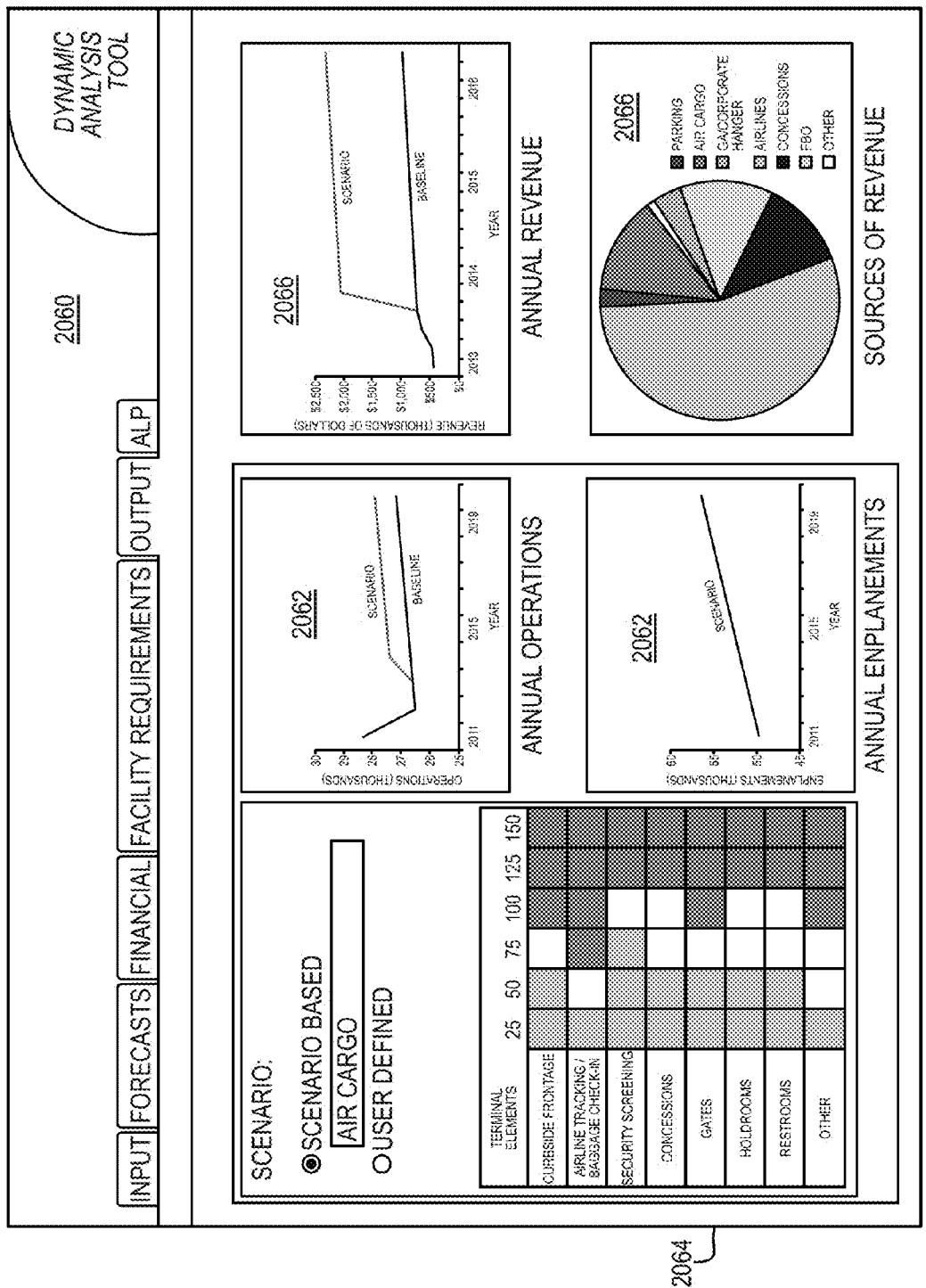
FIG. 6 depicts an exemplary Output summary for a dynamic analysis tool, according to one embodiment of the invention.

The dynamic analysis tool 2000 may further include creation of an output or summary screen at a step 2060 in response to the facility requirements and financial data generated at steps 2040 and 2050, respectively. FIG. 6 depicts an exemplary Output 2060 for an Air cargo scenario, according to one embodiment of the invention. The Output 2060 may include a Facility Requirements portion 2062, a Forecasting portion 2064, and a Financial Data portion 2066, for example. The charts and graphs illustrated in the Output screen can be generated from the data compiled from any or all of the steps 2020, 2030, 2040, or 2050 described above. The Output 2060 is useful for the user to quickly ascertain the macro-level changes of the scenario.

In the air cargo scenario described above, possible output scenarios may include several feasible site locations on the airport property. Feasibility is determined by examining the constraints imposed on each output scenario. Some candidate output scenarios may be discarded due to exorbitant cost, insufficient land, or violation of local noise ordinances, for example. Other candidate output scenarios may be deemed feasible because they can be implemented within the constraints imposed by the existing conditions data. For example, a new commercial passenger terminal may be deemed feasible so long as there is sufficient land for the site, ample room for increased parking, no adverse environmental impact, and the expectation to generate significant revenue for the airport.

The various feasible output scenarios are processed through a sequence of steps that identify and select the best scenario among the choices. Selection criteria for 'best choice' may vary according to the particular application, but generally may include factors such as revenue and expense, environmental impact, and safety, for example.

As noted above, an airport layout plan (ALP) is critical to the approval and tracking of any airport project. Due to the complicated nature of the ALP and the vast amount of information they may contain, a comparison document may be advantageous to illustrate the changes between an existing ALP and a modified ALP incorporating the user-selected scenario. The method 2000 may therefore include a baseline ALP 2070, such as the embodiment illustrated in FIG. 7. The baseline ALP 2070 may be generated using data from a Geographic Information System (GIS) database, for example. The aerial view shown in FIG. 7 includes highlighted areas signifying visual representations of parameters in the existing conditions database 54, the GIS, or both. For example, existing runway protection zones 2072 are denoted in white lines.

Figure 7:
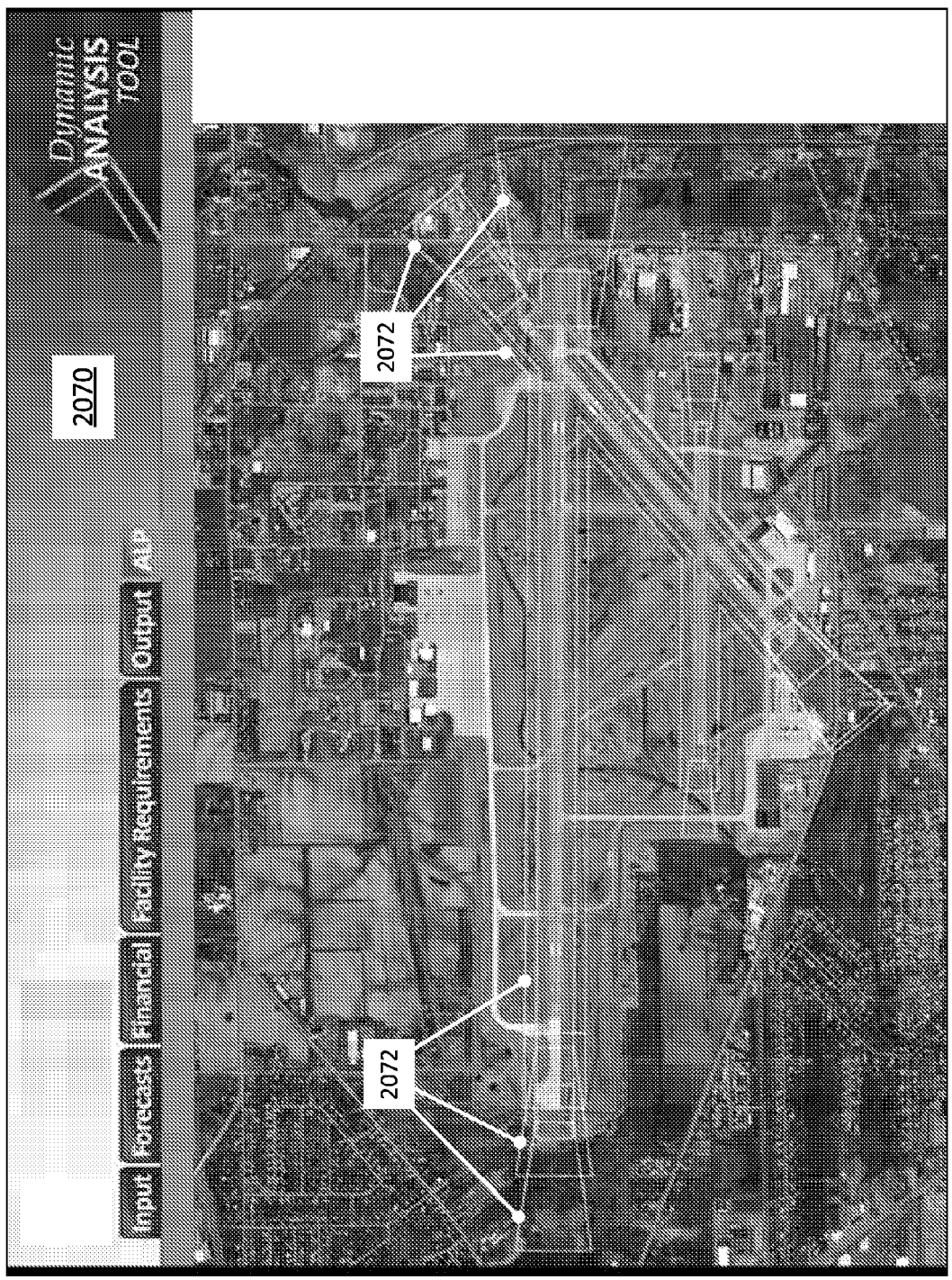
FIG. 7 depicts an exemplary screen shot of an existing (baseline) Airport Layout Plan according to one embodiment of the invention.
Figure 8:
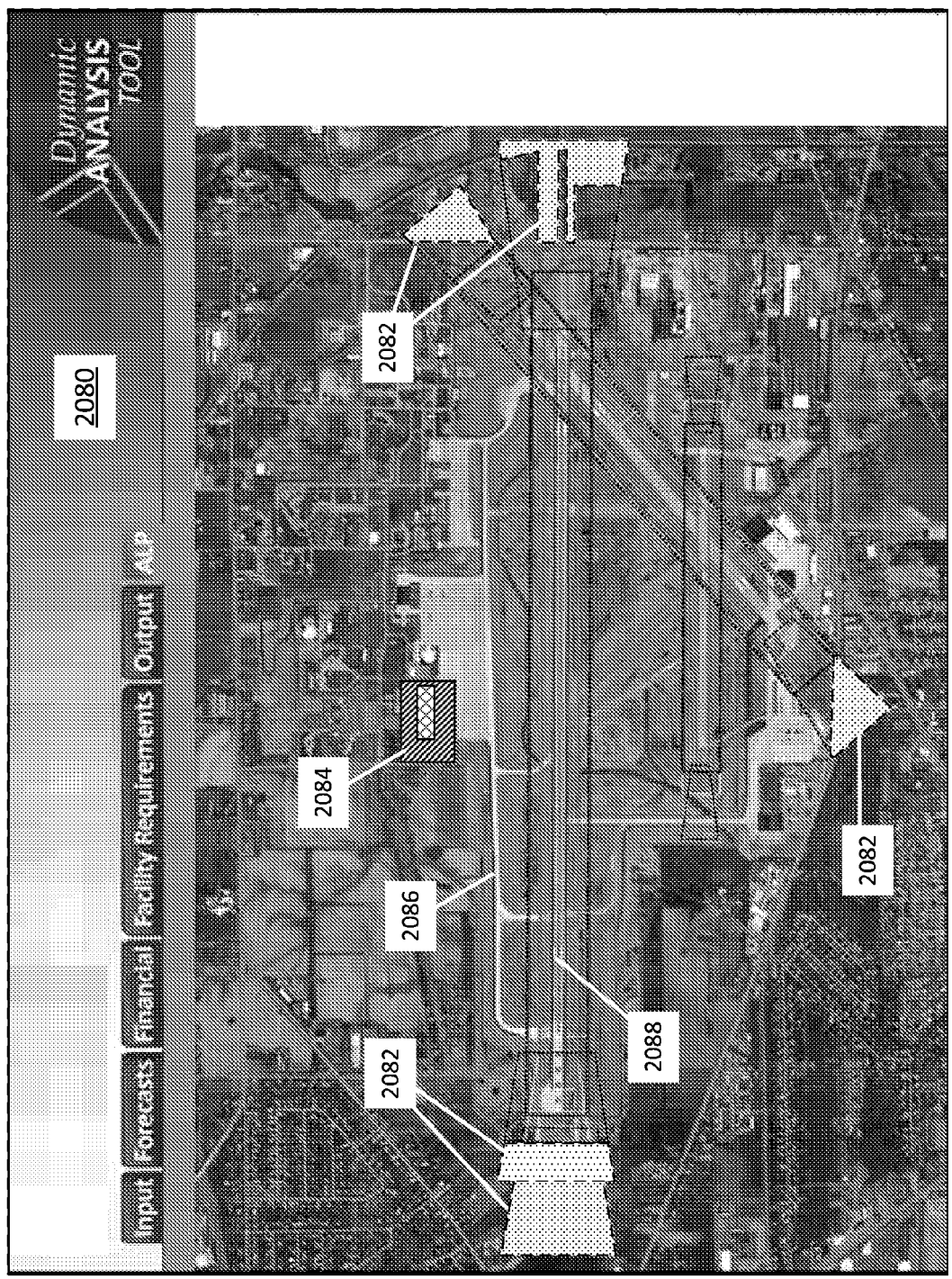
FIG. 8 depicts an exemplary screen shot of an Airport Layout Plan generated by the dynamic analysis tool according to one embodiment of the invention.

The method 2000 further includes generating a dynamic airport layout plan graphically representing the facility requirements. FIG. 8 depicts one example of a dynamic Airport Layout Plan 2080 according to one embodiment of the invention. The dynamic Airport Layout Plan 2080 may include a GIS-based output, similar to the baseline described in FIG. 7, but may further include layers tied to the various alternatives selected in the scenario. The layers may include shape files, for instance, to graphically illustrate the outcomes of the scenario. When compared to the baseline ALP in FIG. 7, several differences are noted based upon the selected scenarios and user inputs resulting in needed facility upgrades. These differences in the form of facility upgrades include, for example, a new air cargo facility 2084, widened taxiways 2086, larger runway protection zones 2082 and runway centerline lighting 2088.

The user may decide to save the results of the scenario at a step 2090, or return to step 2020 and create a new or refined scenario. If saved, a Master Plan (including the dynamic ALP) or an Updated Airport Layout Plan can be generated from the output data.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed. For example, one or more of the steps and functions disclosed and contemplated herein can be implemented on systems constituted by a plurality of devices (e.g., host computer, interface, reader, and printer) or to a single device.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least five deployment models.

Characteristics may be described as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

Private cloud rentals:

A cloud computing environment is service oriented with a focus on statelessness, low coupling, modularity, and semantic interoperability. At the heart of cloud computing is an infrastructure comprising a network of interconnected nodes.

Figure 9:
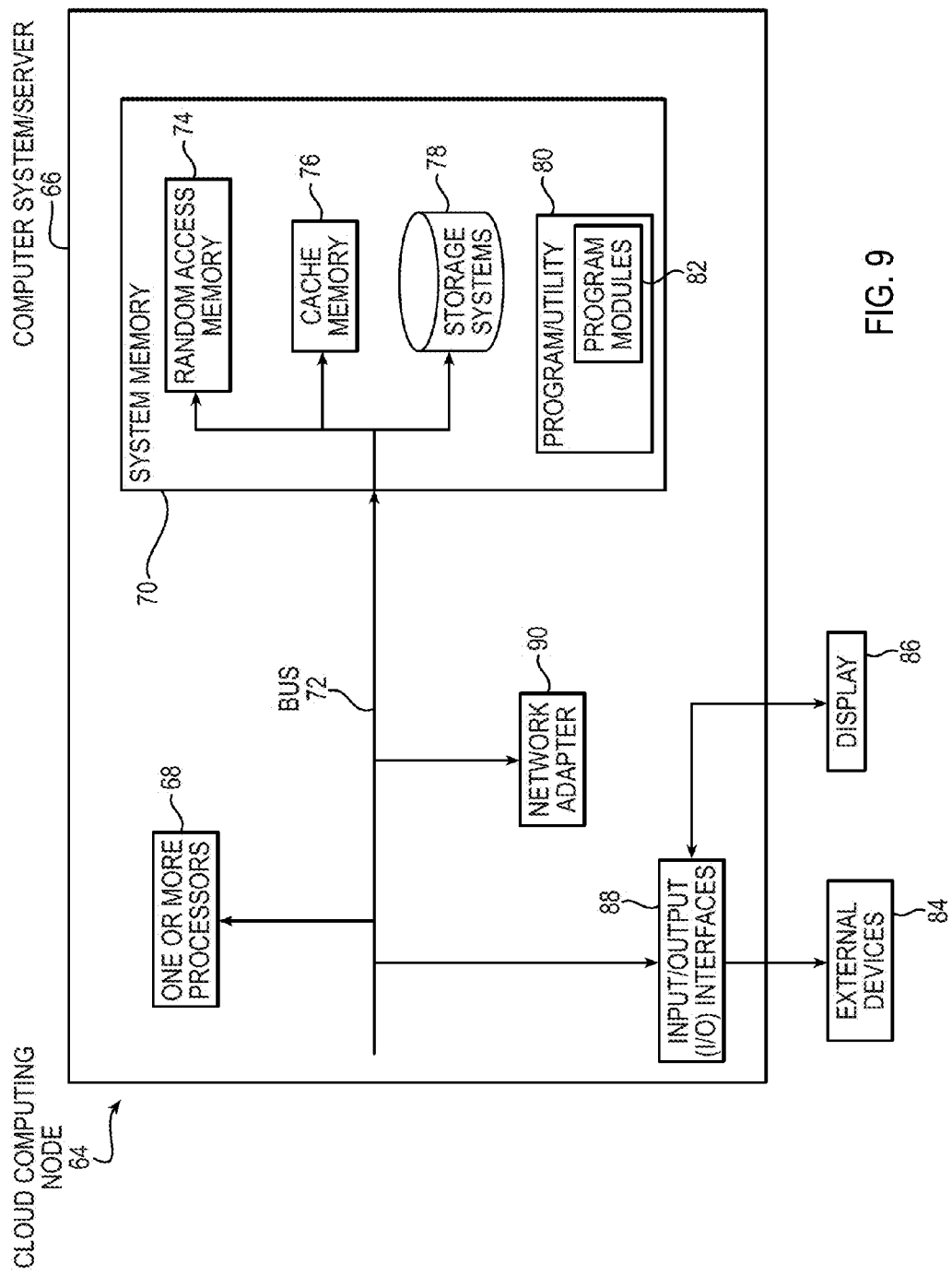
FIG. 9 depicts a cloud computing node according to an embodiment of the present invention.

Referring now to FIG. 9, a schematic of an example of a cloud computing node is shown. Cloud computing node 64 is only one example of a suitable cloud computing node and is not intended to suggest any limitation as to the scope of use or functionality of embodiments of the invention described herein. Regardless, cloud computing node 64 is capable of being implemented and/or performing any of the functionality set forth hereinabove.

In cloud computing node 64 there is a computer system/server 66, which is operational with numerous other general purpose or special purpose computing system environments or configurations. Examples of well-known computing systems, environments, and/or configurations that may be suitable for use with computer system/server 66 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 66 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 66 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 66 in cloud computing node 64 is shown in the form of a general-purpose computing device. The components of computer system/server 66 may include, but are not limited to, one or more processors 68 or processing units, a system memory 70 and a bus 72 that couples various system components including system memory 70 to processor 68.

Bus 72 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 66 typically includes a variety of computer system readable media. Such media may be any available media that is accessible by computer system/server 66, and it includes both volatile and non-volatile media, removable and non-removable media.

System memory 70 can include computer system readable media in the form of volatile memory, such as random access memory 74 (RAM) and/or cache memory 76. Computer system/server 66 may further include other removable/non-removable, volatile/non-volatile computer system storage media. By way of example only, storage system 78 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 72 by one or more data media interfaces. As will be further depicted and described below, memory 70 may include at least one program product having a set (e.g., at least one) of program modules that are configured to carry out the functions of embodiments of the invention.

Program/utility 80 having a set (at least one) of program modules 82, may be stored in memory 70 by way of example, and not limitation, as well as an operating system, one or more application programs, other program modules, and program data. Each of the operating system, one or more application programs, other program modules, and program data or some combination thereof, may include an implementation of a networking environment. Program modules 82 generally carry out the functions and/or methodologies of embodiments of the invention as described herein.

Computer system/server 66 may also communicate with one or more external devices 84 such as a keyboard, a pointing device, a display 86, etc.: one or more devices that enable a user to interact with computer system/server 66; and/or any devices (e.g., network card, modem, etc.) that enable computer system/server 66 to communicate with one or more other computing devices. Such communication can occur via Input/Output (I/O) interfaces 88. Still yet, computer system/server 66 can communicate with one or more networks such as a local area network (LAN), a general wide area network (WAN), and/or a public network (e.g., the Internet) via network adapter 90. As depicted, network adapter 90 communicates with the other components of computer system/server 66 via bus 72. It should be understood that although not shown, other hardware and/or software components could be used in conjunction with computer system/server 66. Examples, include, but are not limited to: microcode, device drivers, redundant processing units, external disk drive arrays, RAID systems, tape drives, and data archival storage systems, etc.

Figure 10:
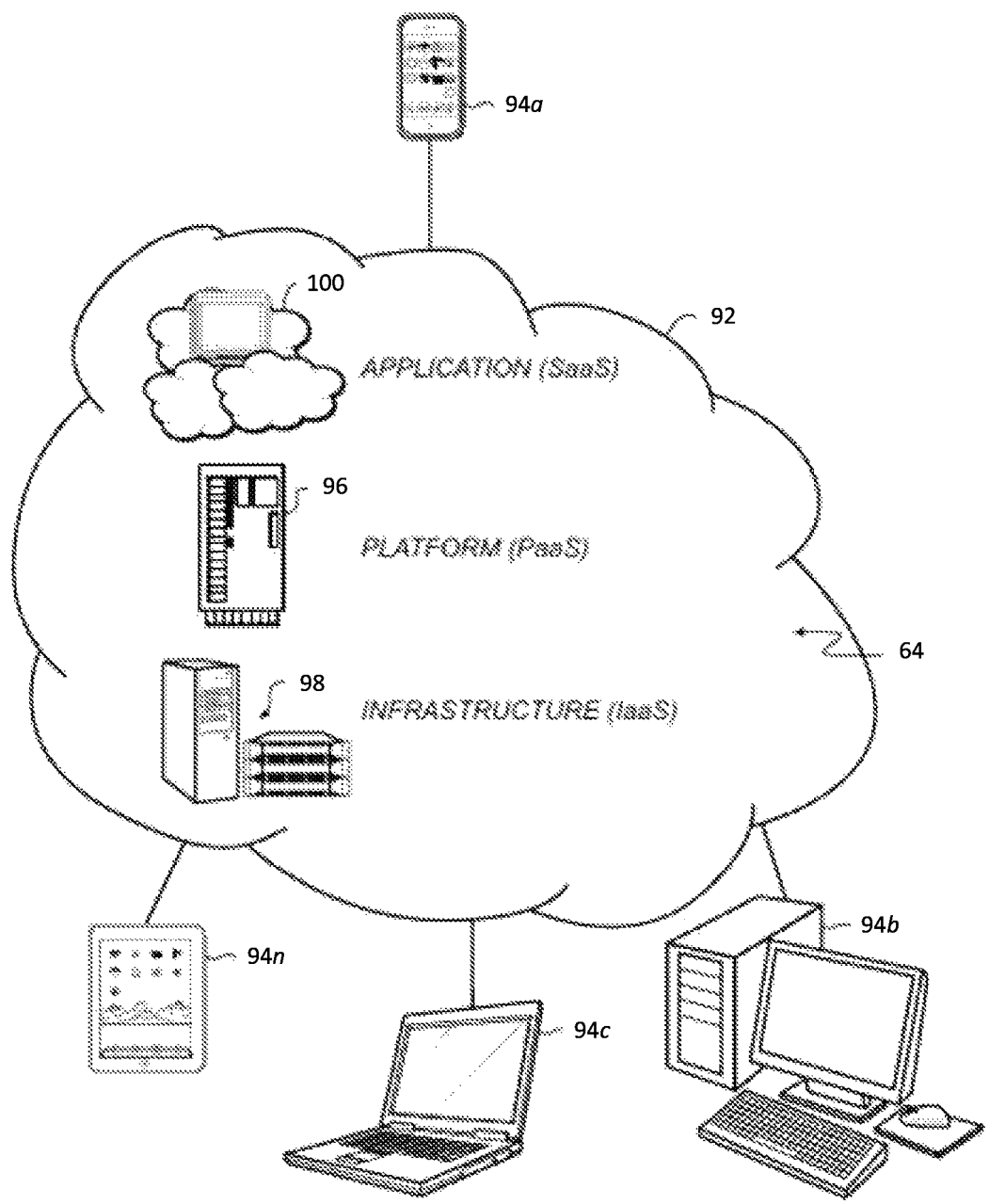
FIG. 10 depicts a cloud computing environment according to an embodiment of the present invention.

Referring now to FIG. 10, illustrative cloud computing environment 92 is depicted. In the illustrated embodiment, cloud computing environment 92 includes one or more cloud computing nodes 64 with which local computing devices used by cloud consumers, such as, for example, cellular or "smart" telephone local computing devices 94a, desktop computer 94b, laptop computer 94c, and/or tablet computer system 94n may communicate. Nodes 64 may communicate with one another. Although not shown, they may be grouped physically or virtually, in one or more networks, such as Private, Community, Public, Hybrid, or Rental clouds as described hereinabove, or a combination thereof. This allows cloud computing environment 92 to offer infrastructure, platforms and/or software as services for which a cloud consumer does not need to maintain resources on a local computing device. It is understood that the types of computing devices 94a-n shown in FIG. 7 are intended to be illustrative only and that computing nodes 64 and cloud computing environment 92 can communicate with any type of computerized device over any type of network and/or network addressable connection (e.g., using a web browser).

The cloud computing environment 92 provides hardware and software components. It should be understood in advance that the components and functions shown in FIG. 8 are intended to be illustrative only and embodiments of the invention are not limited thereto. Examples of hardware components include mainframes, servers, Reduced Instruction Set Computer architecture based (RISC) servers, storage devices, networks, and networking components. Examples of software components include network application server software, application server software, and database software.

The cloud computing environment 92 may further provide virtual entities 96 such as virtual servers, virtual storage, virtual networks, including virtual private networks, virtual applications and operating systems, and virtual clients.

In addition, the cloud computing environment 92 may provide management functions 98 such as resource provisioning for dynamic procurement of computing resources and other resources that are utilized to perform tasks within the cloud computing environment. Management functions 98 may include metering and pricing to provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. A user portal 100 such as a web application site provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

The cloud computing environment 92 provides functionality for which the cloud computing environment may be utilized. For example, functions which may be provided include software development and lifecycle management, data analytics processing, and transaction processing.

Figure 11:
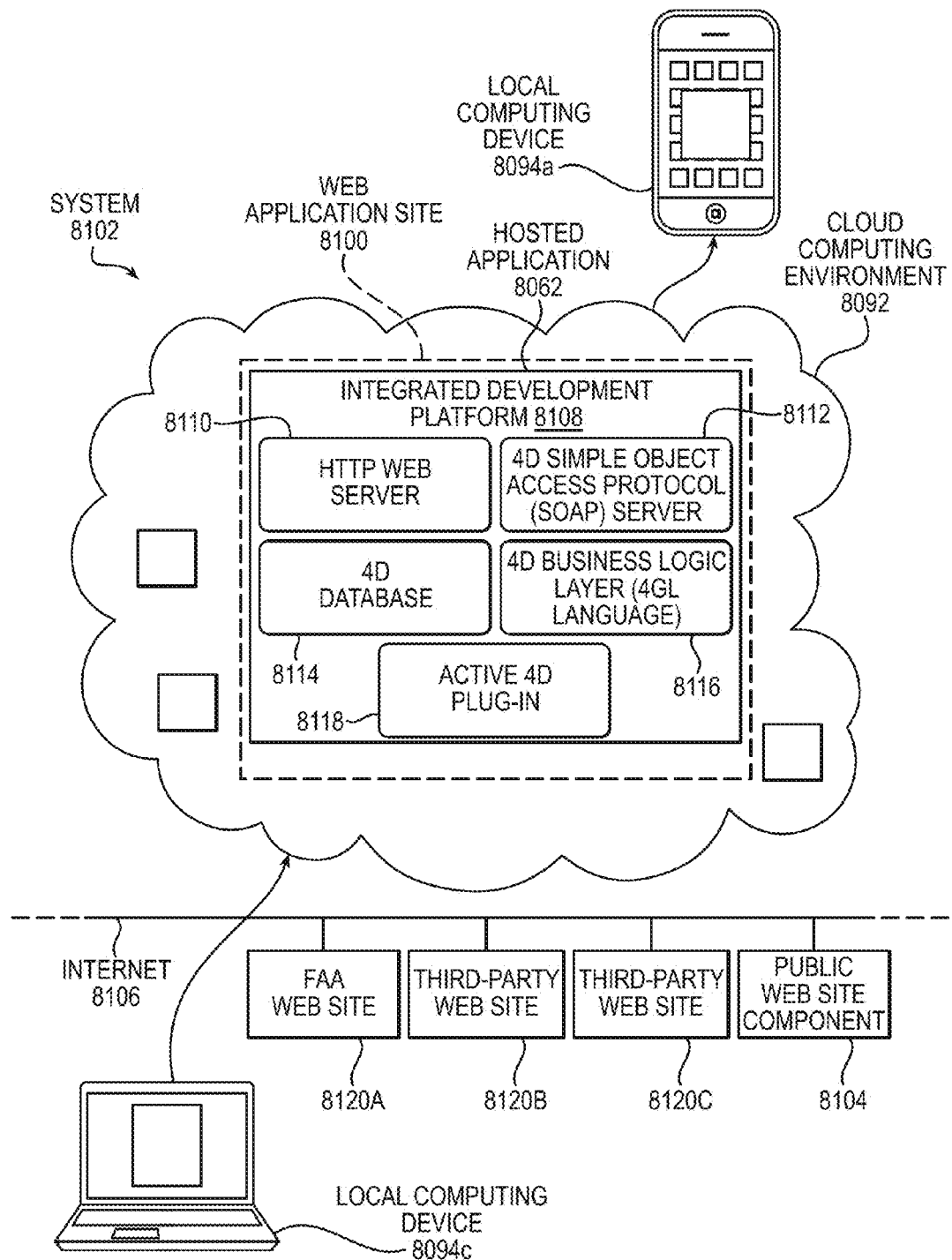
FIG. 11 depicts a system for providing a dynamic aviation tool in a cloud computing environment according to another embodiment of the present invention.

Turning to FIG. 11, wherein like numbers indicate like elements from FIGS. 9 and 10, a system 8102 for providing a dynamic aviation tool in a cloud computing environment 8092 is depicted according to one embodiment of the current invention. The cloud computing environment 8092 includes a web application site 8100 that can be accessed only by subscribers. Subscribers log on to the web application site 8100 from a local computing device 8094, such as a laptop computer, to use the dynamic analysis program 8062.

In one embodiment, the web application site 8100 is hosted by Amazon Web Services' Elastic Compute Cloud (EC2)

component. The Amazon EC2 component provides resizable compute capacity in the Amazon cloud. An application owner can define their virtual Amazon EC2 environment with the operating system, services, databases, and application platform stack required for their hosted application. Amazon EC2 then provides a full management console and Application Program Interfaces (APIs) to manage the particular compute resources. In one example, the system 8102 utilizes one Small Instance with 1.7 GB of memory, one EC2 Compute Unit (e.g., one virtual core with one EC2 Compute Unit), 160 GB of local instance storage, 32-bit platform running Microsoft Windows Server® 2008r3. In one embodiment of the invention, the hosted dynamic analysis tool 8062 on the web application site 8100 allows a user to access the most current existing conditions data.

The system 8102 may further include one or more public web sites component 8104 that is accessible by any user of the Internet 8106. The public web site 8104 can include background information, sales materials, marketing information, and pricing for the company offering the dynamic analysis services.

The web application site 8100 furthers include an integrated development platform 8108 that provides a rapid application development environment. In one example, the integrated development platform integrated development platform 8108 is the 4D program module published by 4D SAS. The 4D software can be installed on the Cloud application site 8100 (e.g., the Amazon Cloud EC2 component) and form the basis of the disclosed method and computer program product for dynamic aviation planning. The 4D program module has within it the following components that can be used in providing embodiments of the invention disclosed herein: an HTTP web server 8110 to serve web pages for subscribed members; a 4D Simple Object Access Protocol (SOAP) server 8112, which publishes SOAP methods accessible by SOAP clients. Further components that can be used in providing embodiments of the invention include: a 4D database 8114 where all the information is held in relation to subscribers, usage, etc.; and a 4D Business Logic Layer (4GL Language) 8116, which is used to handle all back office tasks like maintaining the database environment, for example.

The integrated development platform 8108 may further include an Active 4D plug-in 8118 for the 4D environment that allows the implementation of 4D code within web pages and also handles and manages web-based user sessions on the server.

Program modules operating in the cloud computing environment 8092 may also access a third-party web site 8120 to perform certain tasks. In one example, an FAA web site 8120A may be used to update or transfer data to the hosted application 8062.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

What is claimed is:

1. A computer-implemented dynamic analysis tool for aviation planning, comprising:
   a computer processor;
   a computer readable storage medium coupled to the computer processor;
   memory coupled to the computer processor;
   an existing conditions database coupled to the computer processor, the existing conditions database comprising existing conditions data selected from the group consisting of: the physical facilities on the airport, the regional setting of the airport and surrounding land uses, the environmental setting of the airport, aviation forecasting baseline data, and airport business affairs;
   program instructions to create an aviation planning scenario by accepting a user-selectable parameter associated with the existing conditions data;
   program instructions to compute future growth forecast data of future levels of aviation activity in response to the user-selectable parameter;
   program instructions to compute airport facility requirements needed to satisfy the user-selectable parameter by comparing the difference between the future growth forecast data and the existing conditions data; and
   program instructions to create a dynamic airport layout plan graphically representing the facility requirements;
   wherein the program instructions are stored on the computer readable storage medium for execution by the computer processor.

2. The dynamic analysis tool according to claim 1, wherein the existing conditions database further includes historical financial data for the airport.

3. The dynamic analysis tool according to claim 1, further comprising program instructions to generate financial data of projected future revenues and expenses based upon the facility requirements to satisfy the aviation planning scenario.

4. The dynamic analysis tool according to claim 3, further comprising program instructions to create an output summary based upon the facility requirements and financial data.

5. The dynamic analysis tool according to claim 4, wherein the output summary comprises a facility requirements portion, a forecasting portion, and a financial data portion.

6. The dynamic analysis tool according to claim 1, further comprising program instructions to create an airport layout plan graphically representing the existing airport facility.

7. The dynamic analysis tool according to claim 1, wherein the dynamic airport layout plan comprises geographic information systems (GIS) based output.

8. The dynamic analysis tool according to claim 7, further including layers tied to the user-selectable parameter.

9. The dynamic analysis tool according to claim 1, wherein the user-selectable parameter is a pre-loaded, scenario-based parameter.

10. The dynamic analysis tool according to claim 9, wherein the scenario-based parameter is selected from the group consisting of new service, air cargo, and low cost carrier.

11. The dynamic analysis tool according to claim 1, wherein the user-selectable parameter is a user-defined parameter.

12. The dynamic analysis tool according to claim 1, wherein the aviation planning scenario is implemented via graphical user interface.

13. The dynamic analysis tool according to claim 1, wherein the dynamic analysis tool is provided as a service in a cloud environment.

14. A computer program product for dynamic analysis of aviation planning functions, comprising:
> a non-transitory computer readable storage medium having computer readable program code embodied therewith, the computer readable program code comprising:
> computer readable program code configured to create an aviation planning scenario by accepting a user-selectable parameter associated with existing conditions data;
> computer readable program code configured to compute future growth forecast data of future levels of aviation activity in response to the user-selectable parameter;
> computer readable program code configured to compute airport facility requirements needed to satisfy the user-selectable parameter by comparing the difference between the future growth forecast data and the existing conditions data; and
> computer readable program code configured to create a dynamic airport layout plan graphically representing the facility requirements.

15. The computer program product according to claim 14, further comprising computer readable program code configured to generate financial data of projected future revenues and expenses based upon the facility requirements to satisfy the aviation planning scenario.

16. The computer program product according to claim 14, wherein the dynamic airport layout plan comprises geographic information systems (GIS) based output.

17. A method for airport dynamic aviation planning, comprising the steps of:
> populating an existing conditions database comprising an inventory of existing conditions data at the airport;
> defining an aviation planning scenario with a graphical user interface by selecting input parameters;
> developing, by a processor, a future growth forecast comprising future levels of aviation activity at the airport in response to the selected input parameter;
> generating, by the processor, facility requirements needed to satisfy the selected input parameter by comparing the difference between the future growth forecast and the existing conditions data; and
> generating, by the processor, a dynamic airport layout plan graphically representing the facility requirements.

18. The method according to claim 17, further comprising the step of generating financial data of projected future revenues and expenses based upon the facility requirements to satisfy the aviation planning scenario.

19. The method according to claim 17, further comprising the step of creating an output summary based upon the facility requirements and financial data.

20. The method according to claim 17, further comprising the step of creating an airport layout plan graphically representing the existing airport facility.

* * * * *